Nov. 22, 1932. W. D. LIPPS 1,888,351
MACHINE FOR MAKING BRUSHES
Filed June 20, 1930 10 Sheets-Sheet 1

Inventor
William D. Lipps
by his Attorney
John R. Nolan

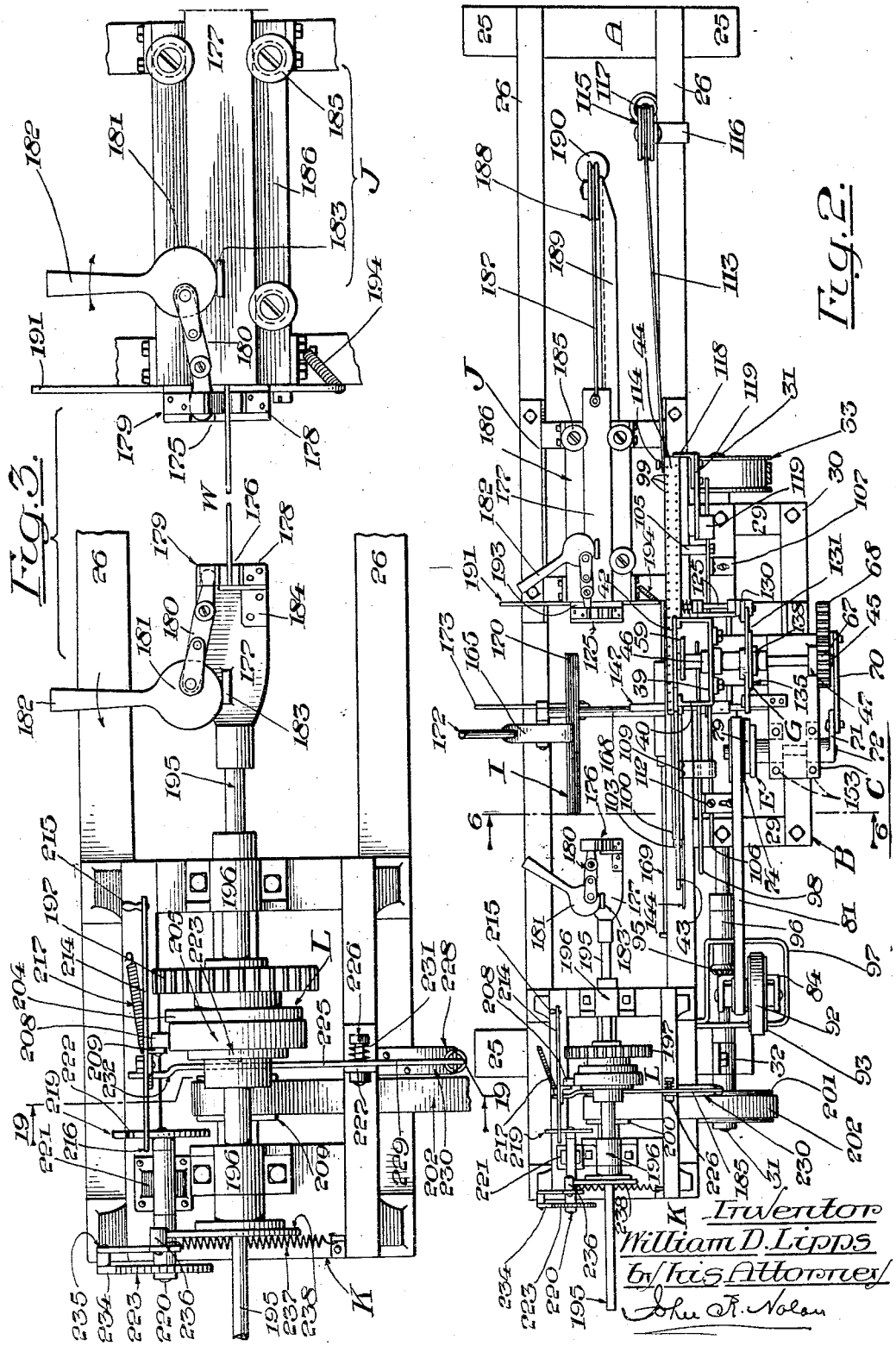

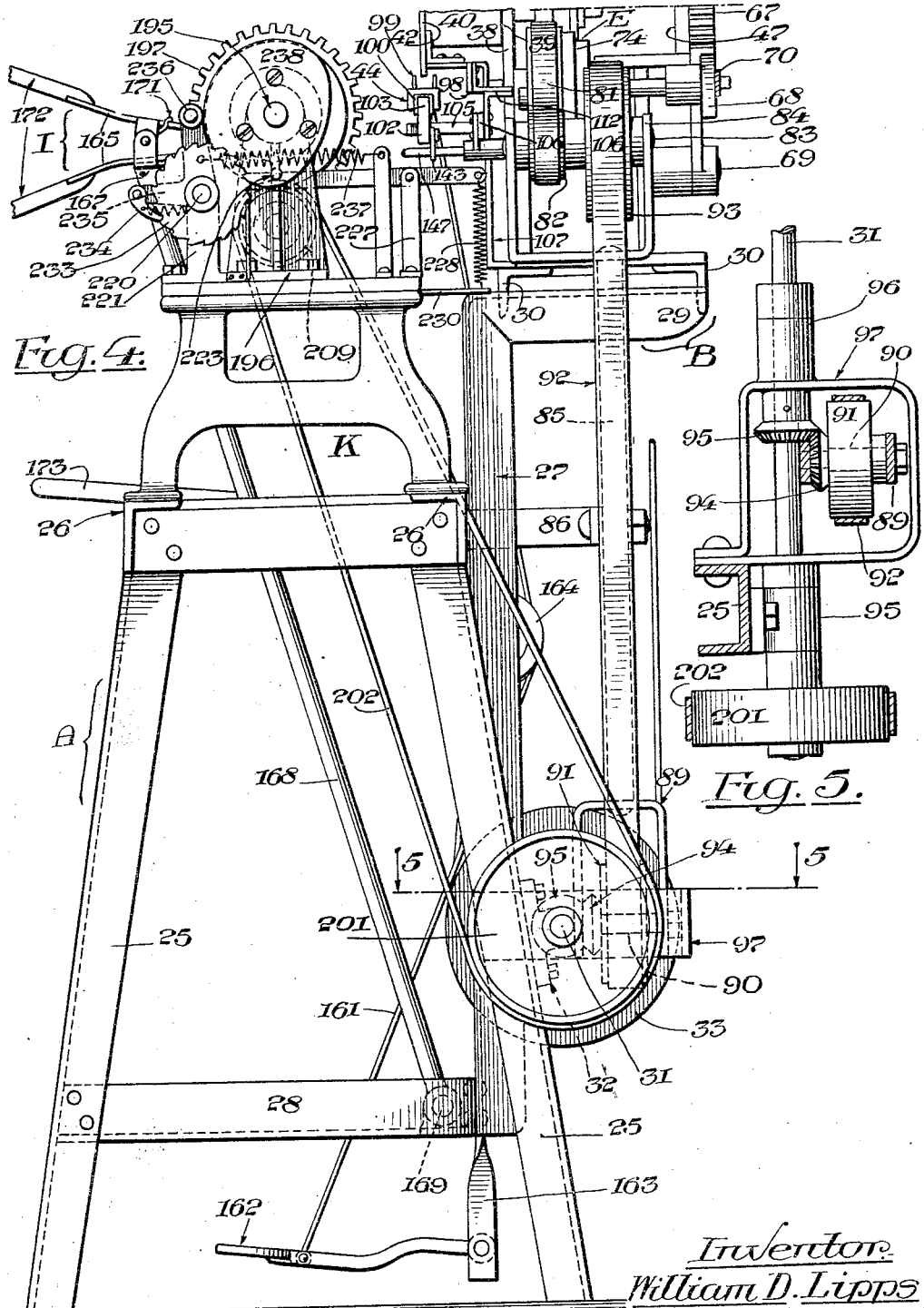

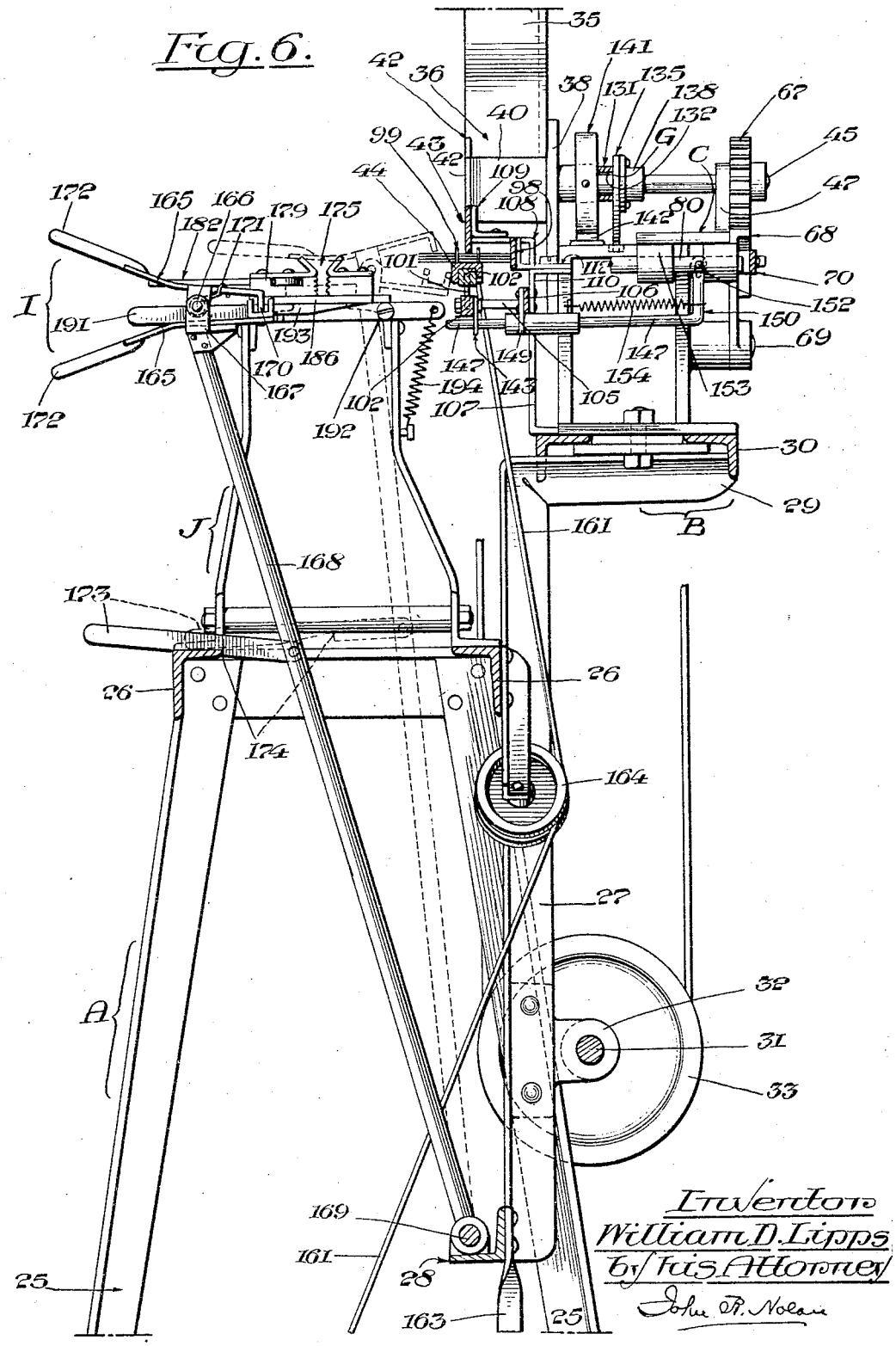

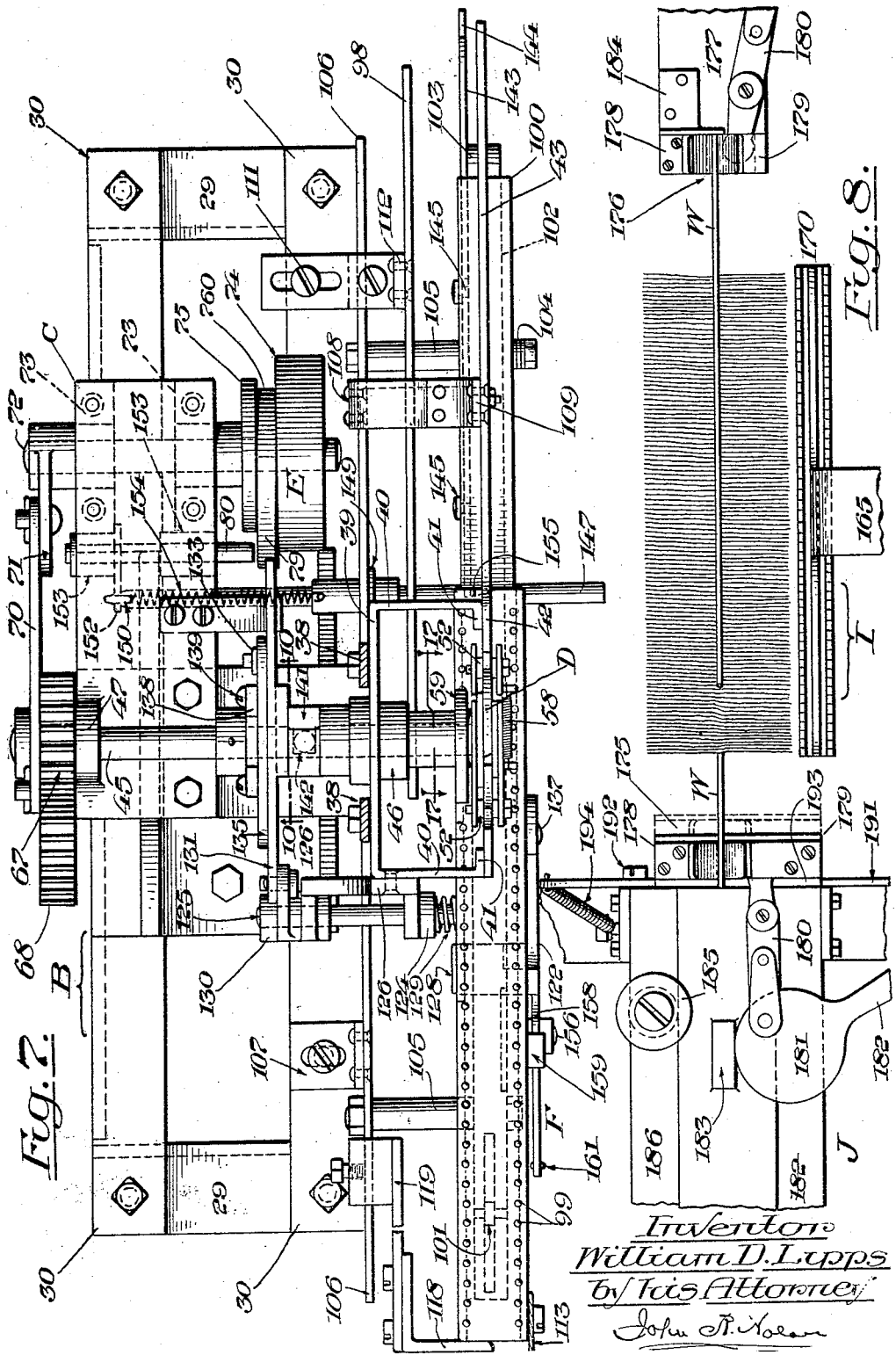

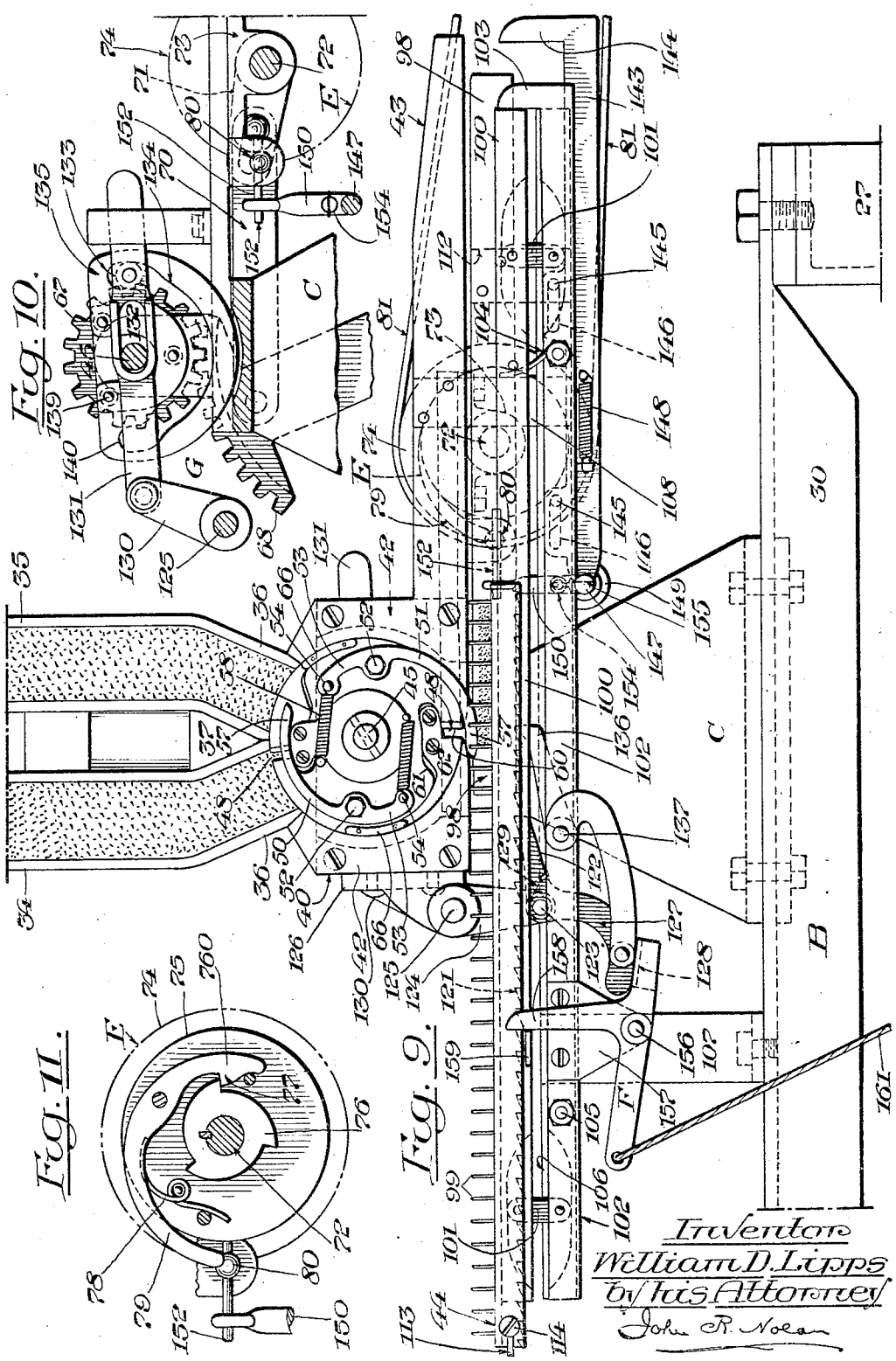

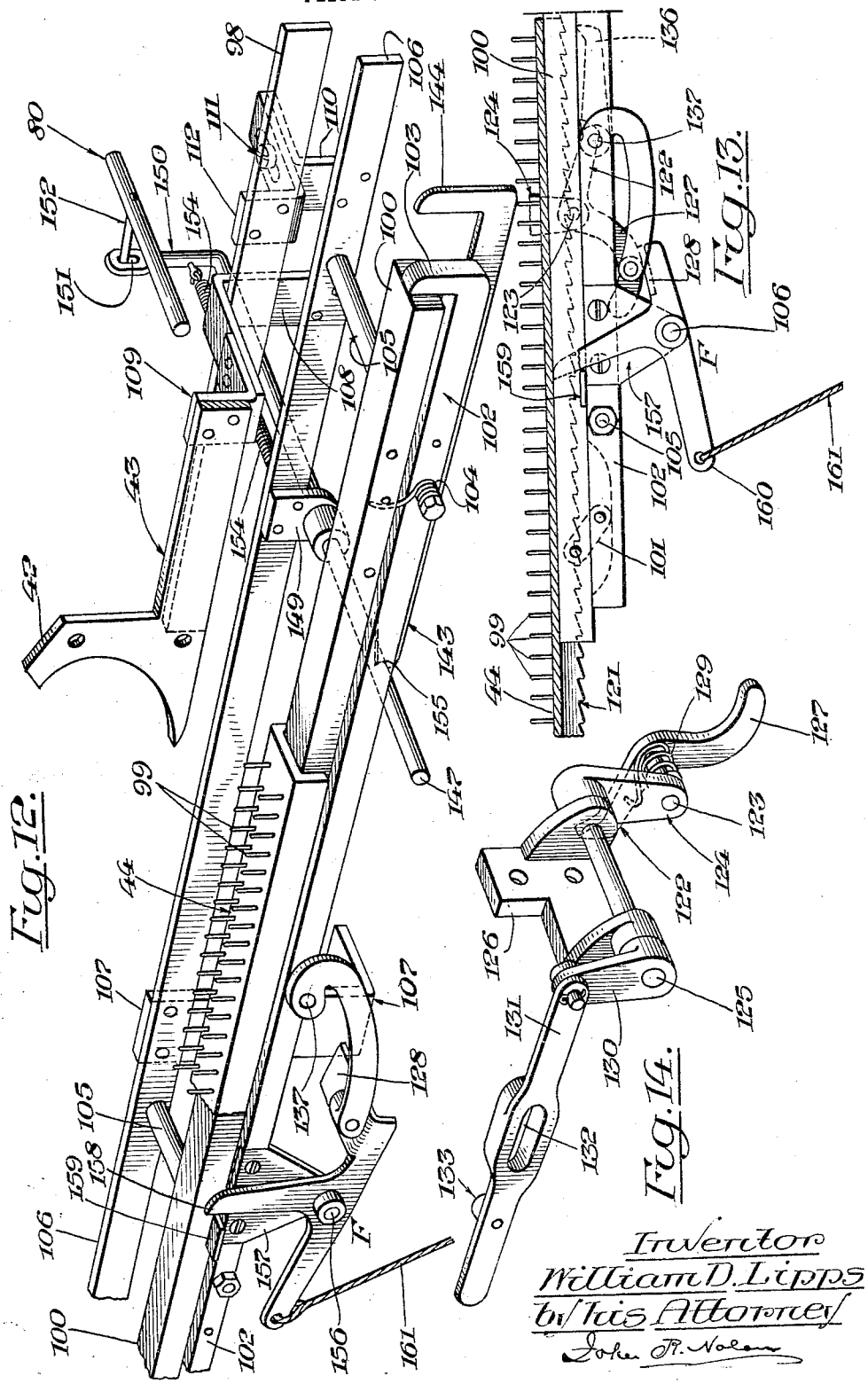

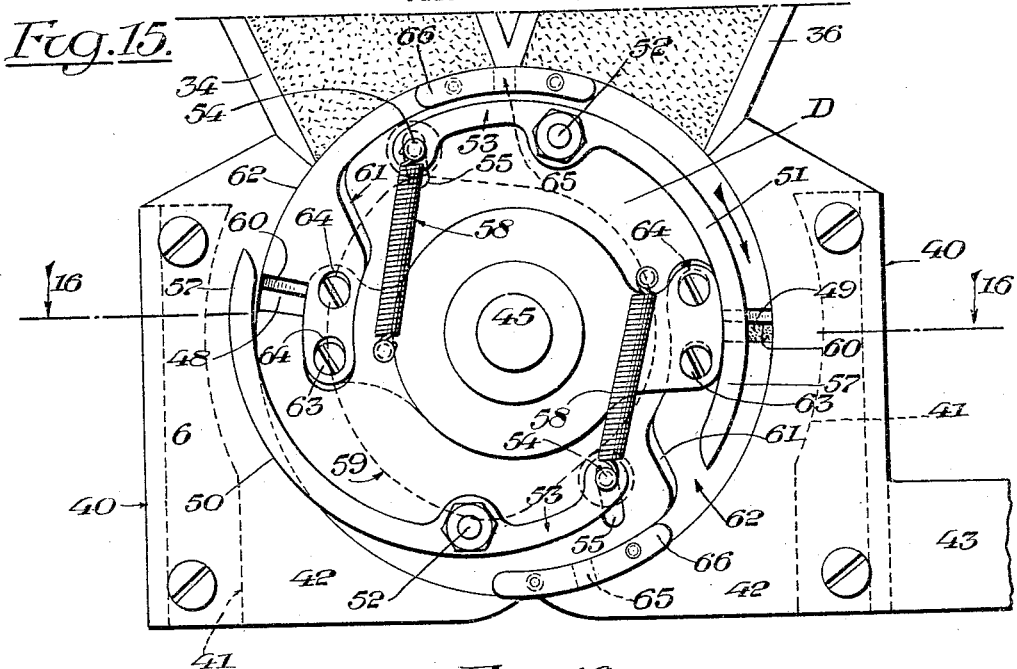
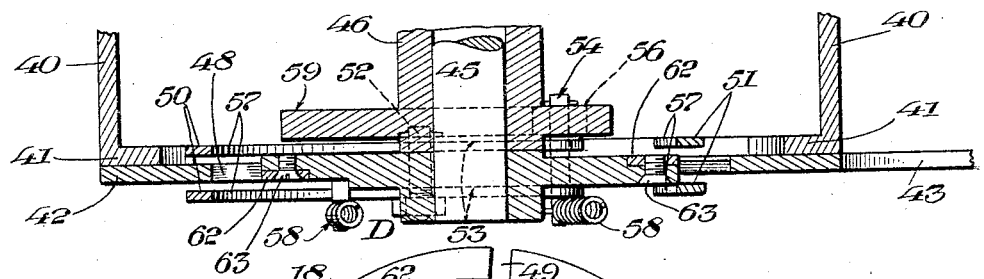
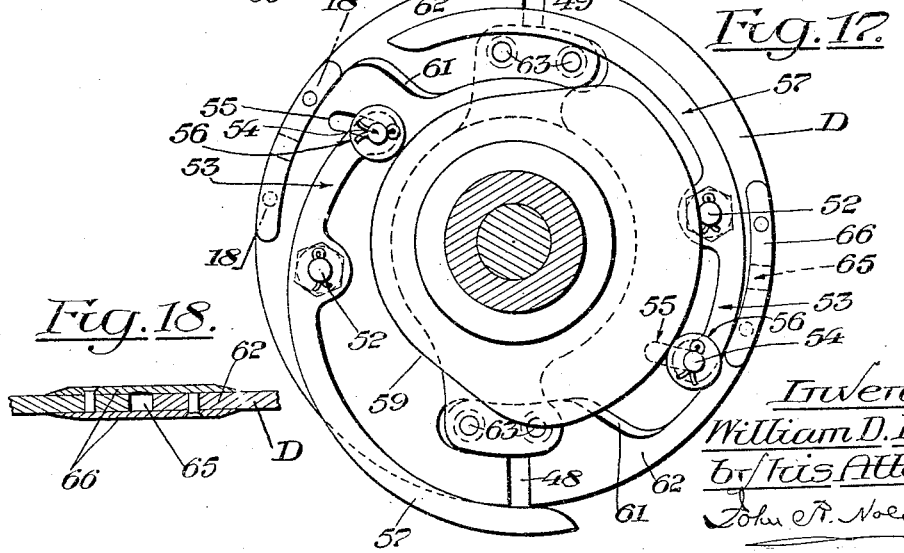

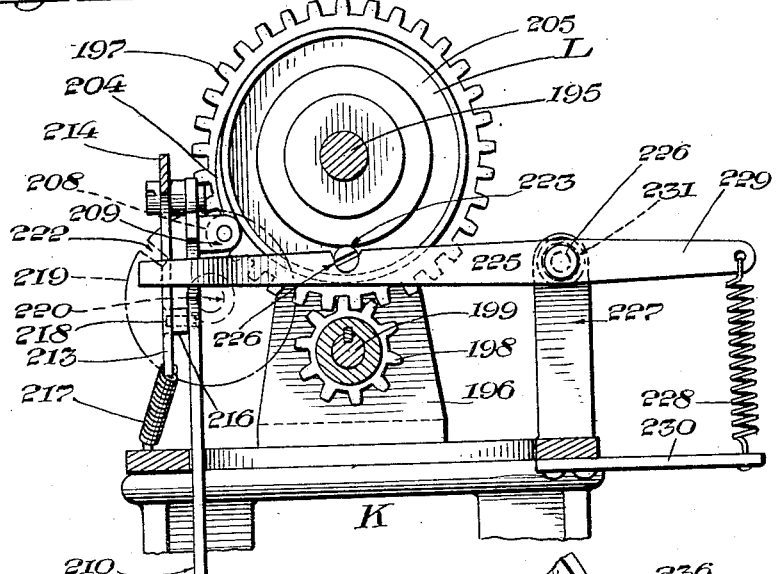
Fig. 19.
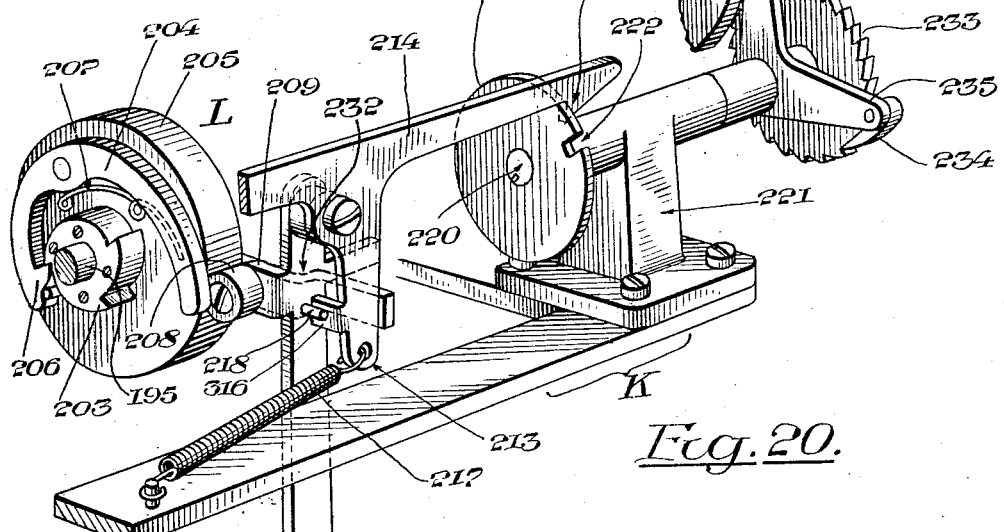
Fig. 20.
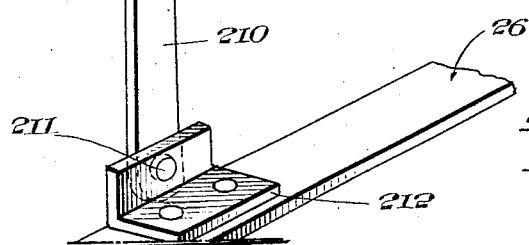

Nov. 22, 1932. W. D. LIPPS 1,888,351
MACHINE FOR MAKING BRUSHES
Filed June 20, 1930 10 Sheets-Sheet 10

Inventor
William D. Lipps
by his Attorney
John R. Nolan

Patented Nov. 22, 1932

1,888,351

UNITED STATES PATENT OFFICE

WILLIAM D. LIPPS, OF FREDERICK, MARYLAND, ASSIGNOR TO OX FIBRE BRUSH COMPANY, INC., OF NEW YORK, N. Y., A CORPORATION OF DELAWARE

MACHINE FOR MAKING BRUSHES

Application filed June 20, 1930. Serial No. 462,498.

This invention relates to machines for making brushes, more particularly the type of brush whereof the fibres or bristles are associated with and supported by a longitudinal central core of twisted wires.

An object of my invention is to provide a machine embodying automatically operating fibre assembling and wire supporting and twisting mechanisms, together with manually-operative means whereby the fibres when assembled can be accurately positioned with respect to the wires preparatory to the operation of the twisting mechanism, the respective mechanisms being so co-ordinated that during the wire twisting operation a succeeding fibre assembling operation can be accomplished.

Another object is to provide a machine whereby a brush having fibres of one color or having fibres of alternately different colors, can be produced.

Another object is to provide a machine whereof the fibre assembling mechanism is automatically stopped when a sufficient quantity of fibres for a brush has been assembled.

Another object is to provide mechanism whereby each succeeding assembling operation can be resumed at the will of the operator.

Another object is to provide manually-operative means whereby the assembled fibres can be accurately positioned with respect to the wire supporting and twisting mechanism.

Another object is to provide means whereby the operation of the twisting mechanism when the fibres and wires are associated, can be commenced at the will of the operator, and whereby when the requisite twisting operation is completed the twisting mechanism is automatically stopped.

With these and other objects in view my invention comprises features of novelty and combinations of parts which, in a preferred form, will be hereinafter described; the scope of the invention then being defined in the appended claims.

In the drawings—

Fig. 2 is a plan of the machine.

Fig. 3 is a partial plan of the same, showing the wire supporting and twisting mechanisms.

Fig. 4 is an end elevation of the machine.

Fig. 5 is a sectional detail, as on the line 5—5 of Fig. 4.

Fig. 6 is a transverse vertical section of the machine, as on the line 6—6 of Fig. 2.

Fig. 7 is a plan of the fibre feeding and assembling mechanism, the fibre supply hoppers being omitted.

Fig. 8 is a plan of the wire supporting chucks and the jaws of the fibre gripper, showing the associated layer of fibres as positioned between the core wires preparatory the twisting operation; the upper wire being partly broken away.

Fig. 9 is a front elevation of the fibre feeding and assembling mechanism shown in Fig. 7, the fibre supply hoppers being in place.

Fig. 10 is a section, as on the line 10—10 of Fig. 7, showing the gear elements and adjuncts of the mechanism for oscillating the fibre transfer head between the hoppers and the intermittently-movable fibre assembling rack.

Fig. 11 is a sectional detail of a clutch member which is included in mechanism for controlling the operations of the transfer head and the assembling rack.

Fig. 12 is a perspective view of a portion of the fibre assembling rack and associated parts, including a foot-controlled lever for effecting the release of the feed and backstop dogs for the assembling rack.

Fig. 13 is a longitudinal section of a portion of the assembling rack and its mounting, showing the foot-controlled lever and the dogs in releasing position.

Fig. 14 is a perspective view of the feed dog and adjuncts.

Fig. 15 is a face view of the oscillatory transfer head and its mounting, showing the head as partially rotated in its travel from fibre receiving position at one of the hoppers to fibre delivery position adjacent the rack.

Fig. 16 is a horizontal section through the transfer head, as on the line 16—16 of Fig. 15.

Fig. 17 is a transverse vertical section at the rear of the transfer head, as on the line 17—17 of Fig. 7, showing the said head positioned to receive and deliver bunches of fibre.

Fig. 18 is a section through spanner plates at the joints of relatively-adjustable body sections of the transfer head, as on the line 18—18 of Fig. 17.

Fig. 19 is a transverse vertical section, as on the line 19—19 of Fig. 3, showing the device for locking the wire twisting spindle upon the completion of the twisting operation.

Fig. 20 is a perspective view of a portion of a clutch element on said spindle, together with controlling devices therefor.

Figure 21:
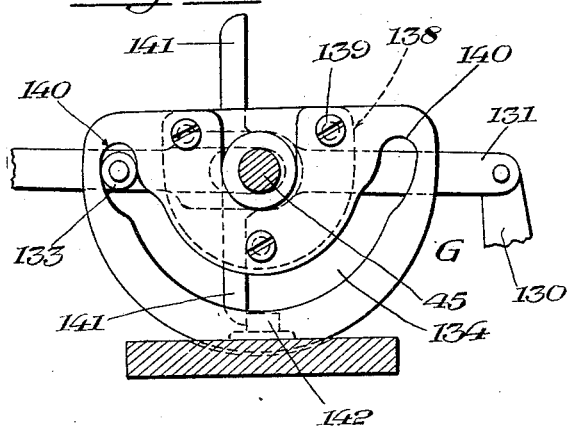
Figure 22:
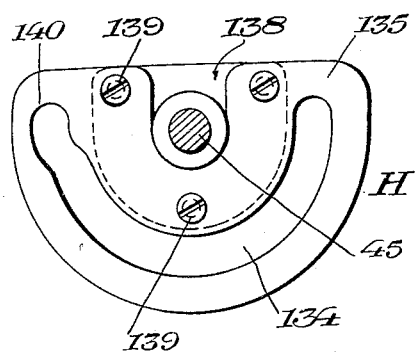

Figs. 21 and 22 illustrate interchangeable cams for effecting and determining the delivery operations of the transfer head; the construction shown in Fig. 21 effecting the removal of fibres from the two hoppers in alternation and their deposit in two succeeding spaces respectively of the assembling rack, and the construction shown in Fig. 22 effecting the removal of fibres from the two hoppers in alternation and their deposit in a single space of the assembling rack.

Figure 23:
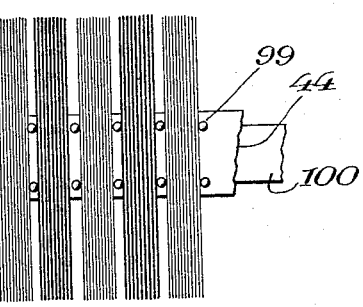
Figure 24:
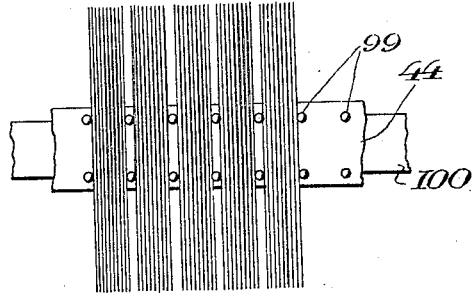

Figs. 23 and 24 illustrate portions of the fibre receiving rack supplied with fibres through the agency of the cams shown in Figs. 21 and 22, respectively.

Figure 25:
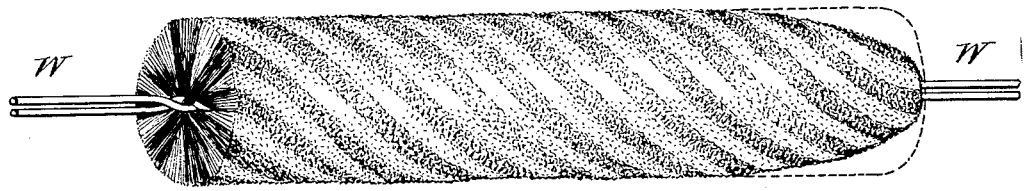

Fig. 25 illustrates a complete brush having spiral rows of fibres of different colors.

Referring to the drawings, A designates a main supporting frame including end standards 25 and spaced parallel top bars 26; and B designates a rearward frame extension situated between the ends of the main frame A. This rearward frame embodies spaced parallel uprights 27 which are secured to the rear bar 26 and are connected at their lower ends to a bar 28 extending from the adjacent frame standard. The upper ends of the uprights have horizontal rear extensions 29 upon which are secured a pair of horizontal top bars 30 on a level above that of the bars 26.

31 designates a horizontal drive shaft which has its bearings in brackets 32 on the main and rear frames A, B, respectively, and is provided with a pulley 33 which is belted with and driven from a suitable source of power.

34, 35 designate two vertical hoppers arranged in spaced relation adjacent the forward side of a supplemental frame C supported on the rearward frame. These hoppers are formed with converging discharge portions 36, each hopper being constructed and adapted to contain a supply of transversely-disposed bristles of fibres.

In the present instance each of the hoppers comprises a sheet metal structure of rectangular cross-section, open on its forward side to facilitate the stacking of the fibres therein. The two hoppers are connected at their lower ends by an interposed block 37, and the double hopper thus provided is detachably mounted on a rectangular casing, open at top and bottom, which is supported above the forward side of the rear frame by uprights 38 rising from the adjacent side of the frame B.

The casing comprises a back wall 39 and side walls 40, the latter having inwardly-extending forward flanges 41 to which are secured spaced face plates 42. (See Figs. 7, 15.) One of these plates has formed on or secured to it a long horizontal guard bar 43 which overhangs the path of an intermittently movable fibre-assembling rack 44 which will be hereinafter described. The inner edges of the face plates 42 are concentric with an embrace an oscillatory fibre-transfer head D which is fast on a transverse shaft 45 having a bearing 46 projecting from the rear wall of the casing, and also a bearing 47 on the frame C.

The transfer head is provided at its periphery with two diametrically-opposite radial slots 48, 49 which during the oscillation of the head are adapted to receive bunches of fibres from the respective hoppers 34, 35 and carry them successively to a position vertically below the axis of oscillation of the head, whereat each succeeding bunch is discharged from its slot and deposited upon the assembling rack 44. (See Figs. 9, 15 and 17.)

Simple and efficient means for alternately ejecting the fibre from the slots of the transfer head comprise two pairs of curved levers 50, 51 pivoted at diametrically-opposite points, on the head. The levers of each pair are arranged adjacent the respective sides of the head and have a common pivot pin 52, the shorter arms 53 of such levers being connected by a cross-pin 54 which passes through an arcuate slot 55 in the transfer head and carries at its inner end a roll 56. The longer arms 57 of the respective pairs of levers constitute fingers which extend beyond the respective slots and are urged outwardly beyond the slots by means of springs 58 secured to the pins 54 of the shorter arms of the levers and to the head. A stationary cam 59 on the bearing 46 projects into the path of the two rolls 56. The contour and arrangement of this cam is such that during the oscillation of the transfer head the roll of the paired levers for the receiving slot is swung outward against the action of the associated spring, thus swinging the fingers of such levers inwardly away from the slot and permitting it to receive a bunch of fibres from the hopper; and the roll of the paired levers for the discharging slot is swung inward by the retractive force of the associated spring, thus moving the fingers of the latter levers outwardly beyond the adjacent slot and ejecting therefrom the contained bunch of fibres at the bottom of the head. (See Figs. 15 and 17.)

In the oscillation of the transfer head as each radial slot (48, 49) leaves its fibre supply hopper and travels toward the delivery position, the opposing arcuate surface of the adjacent face plate 42 serves as a guard to retain the contained fibres in the slot, during which period the proximate pair of spring-pressed lever arms 51 bear yieldably against the fibres, at the respective sides of the transfer head, by virtue of the contour of the cam 59, and press the fibres against the arcuate surface. Thus the fibres are compacted (as seen at the right of Fig. 15) during the delivery stroke of the transfer head, and upon the completion of the stroke such fibres are forcibly and quickly ejected from the slot and uniformly deposited upon the rack.

The trailing wall of each fibre receiving slot, that is, the rearward wall in the active travel of the slot across and below the hopper, is bevelled, as at 60, to facilitate the separation of a bunch of fibres from the mass contained in the hopper. The width of each slot is adjustable to vary the quantity of fibre removed thereby from the mass, as occasion may require. To this end the periphery of the transfer head is recessed, as at 61, adjacent each of the slots, and a segmental filler member 62, whereof one end constitutes the rearward wall of the slot, is seated in the recess. The segmental member is adjustably secured to the body of the head by bolts 63, which pass through elongated openings 64 in the member. Thus the member can be adjusted circumferentially of the head to vary the width of the slot, and then by tightening the bolt nuts the member can be secured in the desired position of adjustment. To close the sides of the joint 65 at the trailing end of the segmental member and thereby preclude the entrance of fibres into the joint as it passes under the hopper, relatively movable spanner plates 66 are secured to the respective sides of the head and the segmental member. (Figs. 17, 18.)

The preferred means for oscillating the transfer head is as follows:

Fast on the rear end of the shaft 45 is a pinion 67 with which meshes a gear sector 68 pivoted at 69 on the outer leg of the frame C. The sector is operatively connected by means of a rod 70 with a crank 71 on the outer end of a transverse shaft 72 which has its bearings in brackets 73 on the top of the frame C. Hence when the shaft 72 is rotated oscillatory motion is transmitted to the sector, and thence through the pinion 67 and shaft 45 to the transfer head. (See Figs. 1, 7, 10.)

On the inner end of the shaft 72 is a pulley 74 between which and its shaft is interposed a clutch E by the control of which the pulley may be rendered fast or loose on the shaft, as will presently appear.

In the present instance the clutch includes a disk 75 having a ratchet hub 76 keyed on the shaft 72 adjacent the face of the pulley. Pivoted on the pulley face is a clutch lever, the shorter arm 760 of which has a tooth 77 which is normally held in engagement with an opposing tooth of the ratchet by means of a spring 78 which is secured to the pulley and arranged to act on the longer arm 79 of the lever. The free end of the latter arm projects beyond the periphery of the pulley and is adapted, when it is desired to unclutch the pulley, to encounter a bolt-like member 80 which is movable into and out of the path of the projecting arm by suitable controlling mechanism hereinafter described. (See Figs. 7, 9 and 11.)

The pulley 74 is connected by means of a belt 81 with a pulley 82 on a short horizontal shaft 83 having its bearings in the limbs of a yoke 84 at the top of a vertical bar 85. The bar is adjustably bolted intermediate its ends to a bracket 86 on the side of the rear top bar 26 of the main frame, and the bracket, in turn, is adjustably secured to the bar by a bolt 87 which passes through a longitudinal slot 88 in the bracket. By this construction the bracket and bar can be nicely adjusted to position the pulley 82 to take up slack in the belt 81 and thus maintain the belt under proper tension.

The lower end of the bar 85 is provided with a yoke 89 in the limbs of which a short shaft 90 is journaled. On this shaft 90 is a pulley 91 which is connected by means of a belt 92 with a pulley 93 fast on the upper shaft 83. The lower shaft 90 has fast thereon a bevel gear 94 which meshes with a similar gear 95 fast on the main shaft 31. Hence the motion is transmitted from the main shaft to the pulley 91 and its shaft 90 and thence through the belt 92 and pulley 93 and its shaft 83. The main shaft is preferably provided with an extra bearing 96 adjacent the bevel gear 95, which bearing is supported by a rectangular strap 97 bolted to the adjacent end standard of the main supporting frame. (See Figs. 1, 2, 4 and 5.)

The fibre assembling rack 44 hereinbefore referred to is movable step-by-step in a path directly below and at right angles to the axis of oscillation of the transfer head in such manner as to receive a succession of bunches of fibre from the head; support them in approximately parallel relation, with their ends extending beyond the respective sides of the rack, (as seen in Fig. 6) and advance them progressively beneath the extended guard bar 43.

A longitudinal bar 98 which is supported in spaced parallel relation to the rack and the guard bar, serves as a backer for the rear ends of the fibres carried by the rack, thus ensuring the uniform endwise arrangement of the succeeding bunches of fibres as the rack progresses from the transfer head. (Figs. 6, 9, 12.)

The assembling rack, in its preferred form, comprises a laterally flanged bar of suitable dimensions having throughout its length two longitudinal rows of up-standing pins 99 arranged in spaced relation to provide a row of close-lying spaces for the reception of bunches of fibre from the transfer head. The rack bar is slidably mounted on a guiding and supporting bar 100, which, in turn, is connected, adjacent its respective ends, by parallel links 101 with an underlying stationary bar 102, thus permitting the bar 100 and the associated rack 44 to be raised and lowered within limits in respect to the transfer head, as will presently appear. The stationary bar 102 is provided at its right hand end, as viewed in Figs. 9 and 12, with an up-standing stop lug 103 against which the guide bar 100 is pressed by means of a suitably disposed spring 104 on the stationary bar. Thus the guide bar and rack are supported in raised position by the upstanding links 101. (See Figs. 6, 9, 12 and 13.)

In the present instance the bar 102 is rigidly connected by cross-rods 105 to a parallel rear bar 106 the left hand end of which is supported by an angle bracket 107 rising from the top of the rear frame B. The right hand end of the bar 102 is secured to the vertical member of an angular bracket 108, the horizontal member of which is fastened to the guard bar 43 by means of an angle piece 109. The bar 106 has also secured to it, adjacent the bracket 108, an angle bracket 110 to which is adjustably secured by a screw and slot connection 111 an angle piece 112 projecting from the backer-bar 98 previously mentioned. By virtue of the screw and slot connection the backer bar can be adjusted in spaced parallel relation to the guard bar as may be required by the length of the fibres deposited on the rack 44.

The rack is normally urged to its retracted position, with its initial fibre receiving space directly under the discharging point of the transfer head, by means, for example, of a cable 113 which is secured to the rear of the rack, as at 114, and is passed about a pulley 115 mounted in a suitably-disposed bracket 116 on the rear top bar 26 of the main frame, the pendant free end of the cable suspending a weight 117 of sufficient mass to pull back the rack to its original position after the rack has reached its forward limit of movement. (See Figs. 1 and 2.)

Figure 1:
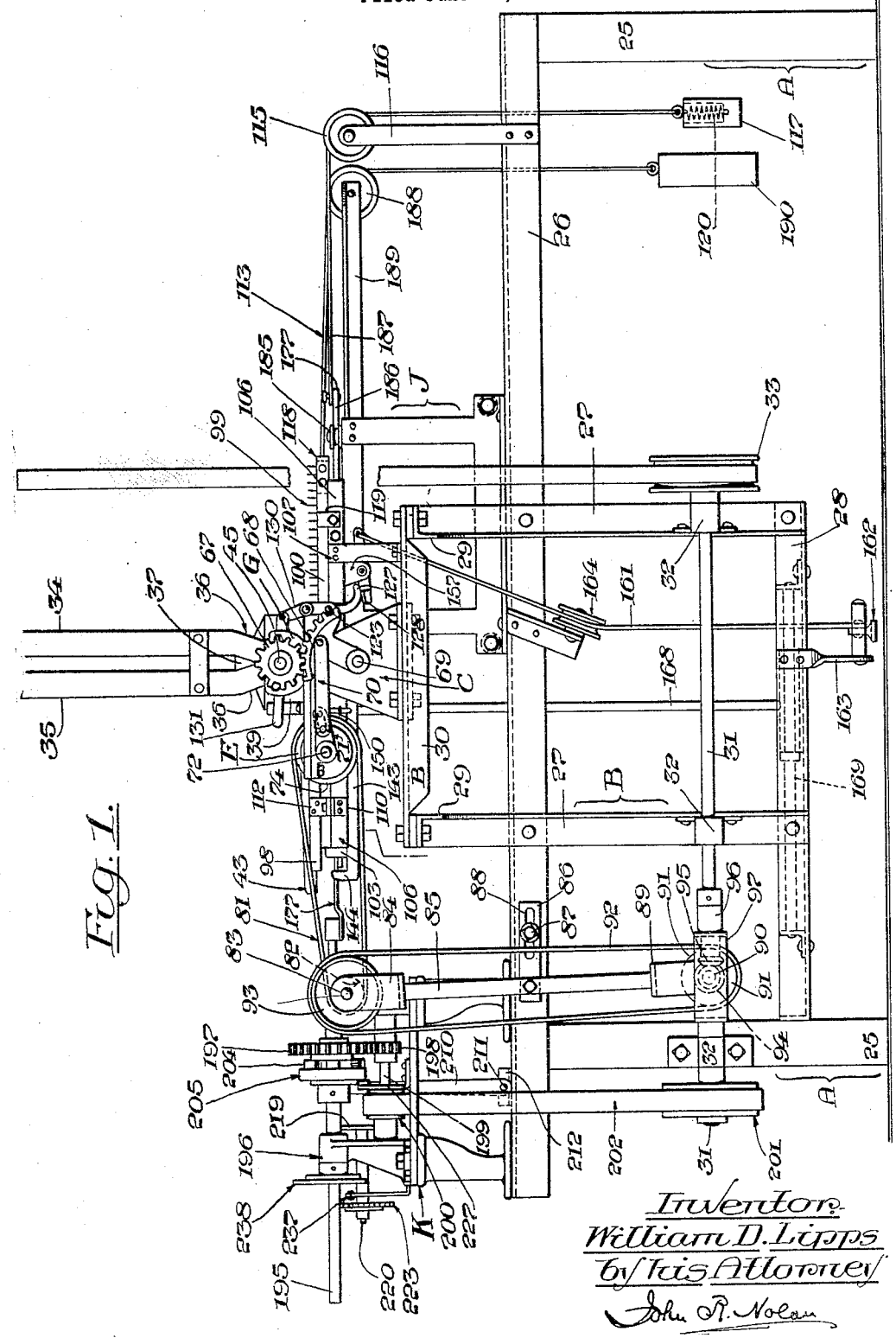
Figure 1 is a rear elevation of a brush making machine embodying the principle of my invention.

A suitably-disposed angle-piece 118 secured to a bracket 119 on the rear end of the fixed bar 106, affords a positive back stop for the rack. In order to modify the force of the impact when the rack strikes the stop, the cable 113 is preferably secured to the weight 117 by a resilient or spring connection 120 contained in the latter. (Fig. 1.)

The preferred means for intermittently moving the rack is as follows, reference being had to Figs. 7, 9, 10, 12, 13 and 14 of the drawings.

The rearward flange of the rack is provided throughout its length with ratchet teeth 121 corresponding in number and relation with the fibre receiving spaces of the rack, which teeth when the rack is positioned to travel below the transfer head and receive the fibres are successively engaged by a reciprocating feed dog 122 which effects the requisite step-by-step movement of the rack. The dog comprises one arm of a rock lever which is pivoted on a pin 123 projecting from a depending arm 124 fast on one end of a short horizontal rock-shaft 125 which has its bearings in a bracket 126 depending from one side of the casing 39, 40. The other arm 127 of the lever is curved downwardly and rearwardly (with respect to the direction of travel of the rack) adjacent an angular projection 128 of a bell-crank lever F hereinafter described. A suitably-disposed spring 129 tends to maintain the dog in raised position in engagement with the ratchet teeth of the rack. On the rear end of the rock-shaft 125 is an upstanding arm 130 to which is pivoted one end of a longitudinally slotted reciprocating arm 131 through the slot 132 of which the shaft 45 freely extends. The arm 131 is provided near its free end with a lateral roll 133 which runs in the race 134 of a cam member 135 fast on one side of the oscillatory gear 67, which cam race is suitably formed to effect the longitudinal reciprocation (two strokes) of the arm at the end of each two oscillatory strokes of the gear 67, or at the end of each oscillatory stroke of the gear, as desired.

A back stop dog 136, which engages the ratchet teeth of the rack, comprises one arm of a rock lever which is pivoted on the bar 102, at 137, the other arm of the lever being curved and positioned adjacent the projection 128 of the bell-crank lever F.

In the case of the reciprocation of the arm 131 at the end of each two oscillatory strokes of the gear 67, the feed dog 122 is actuated at the end of each alternate stroke of the gear so as to position each succeeding fibre-receiving space of the rack beneath the discharge portion of the transfer head and maintain it thereat a sufficient interval of time for the reception of two bunches of fibre,—one from each hopper—; and in the case of the reciprocation of the arm 131 at the end of each succeeding stroke of the gear 67, the feed dog is actuated to position each succeeding fibre-receiving space of the rack, and to retain it a sufficient interval of time, to receive a single bunch of fibre from one or the other hopper.

In the present instance two interchangeable cams 135 (designated G and H respectively) for actuating the arm 131 is employed, the cam G (Fig. 21) being used for double or single color feeding wherein the fibres from the two hoppers in alternation are deposited in two succeeding spaces of the assembling rack; and the cam H (Fig. 22) for double or single color feeding wherein the fibres from the two hoppers in alternation are deposited in each succeeding space of the rack. Each of these cams embodies a plate having an approximately semicircular cam race therein and being detachably mountable on a flanged collar 138 fast on the gear shaft 45 by means of screws 139. The race of the cam G is provided at its respective ends with offset portions 140 which effect the reciprocation of the roll and arm at the end of each single stroke of the cam G and gear 67, and the race of the cam H is provided at one end with a similar offset portion 140 which effects the reciprocation of the roll and arm at the end of each double stroke of the cam H and gear 67.

In order positively to limit the semi-rotations of the gear shaft 45, and its connections, the shaft has affixed thereto a pair of oppositely-extending arms 141 which alternately abut against a stop 142 on the table during the oscillation of the shaft. (See Figs. 7, 21.)

A portion of the assembling rack as supplied with fibres of different colors in alternation is illustrated in Fig. 23; and a portion of the rack as supplied with a single color is illustrated in Fig. 24.

When the rack has received a proper supply of fibres, the clutch E for the pulley 74 is automatically actuated to disengage its tooth from the clutch member 76 of the disk 75, and thus unclutch the pulley, thereby checking the rotation of the shaft 72 and the operation of the transfer head and rack-feeding mechanism. Means for this purpose is of the following description:

Slidably mounted at one end of the stationary supporting bar 102 for the rack guiding bar 100, is a horizontally movable trip bar 143, one end of which projects beyond the bar 102 and is provided with an up-standing toe 144 which extends into the path of one side of the rack 44 when the latter approaches the limit of its longitudinal travel upon the completion of the fibre-filling operation. The trip bar 143 is slidably supported by pins 145 which project from the bar 102 through slots 146 in the trip bar, such trip bar being maintained normally retracted with its inner end in contact with a transverse clutch-operating rod 147 by means of a suitably disposed retracting spring 148. The rod 147, which is slidably mounted in a bearing bracket 149 on the bar 106 and extends toward the rear of the machine in the vicinity of the gear 67, is formed with an up-standing arm or bend 150 having therein a slot 151 through which freely extends a pin 152 from the bolt-like member 80 previously referred to. This member is slidably mounted in brackets 153 on the under side of the top of the frame C, and is adapted by actuation of the rod 147 to be moved into and out of the path of the projecting arm 79 of the clutch-lever. When the rod 147 is in the path of the clutch lever, such lever, in its rotation encounters the lever arm 79 and effects the release of the clutch, thus stopping the rotation of the pulley 74 as previously mentioned. When the rod 147 is retracted the clutch lever assumes its normal condition and the pulley is clutched to the shaft.

A spring 154 secured to the upstanding bend of the rod 147 and to the bracket 149 urges the said rod and the associated bolt member 80 forward to the unclutching position. The forward end of the rod 147 is formed with a notch 155, which when the rod and bolt are manually pressed rearward, is engaged by the inner end of the spring-retracted trip-bar 143, said rod and bolt thus being held in rearward position against the action of the spring 154. Hence when the fibre assembling rack impinges against the opposing up-standing toe 144 of the trip-bar, as previously mentioned, said bar is retracted from the notch of the rod 147; whereupon the spring 154 retracts the rod 147 and the bolt is shot forward into the path of the clutch lever. (See Figs. 7, 9 and 12.)

This done, the layer of fibres assembled on the rack 44 is clamped at its forward end by a manually-operative gripper I hereinafter described, and pulled forward to cooperative relation with wire supporting and twisting mechanism through the instrumentality of which the associated wires and fibres are twisted to produce a cylindrical brush having an axial core of twisted wire, as will be hereinafter described.

Means for releasing the rack and permitting its retraction by the weighted cable 113 to the initial position under the center of the transfer head, preparatory to another fibre-assembling operation, is as follows:

The bell-crank lever F hereinbefore referred to is pivoted at 156 on a depending bracket 157 on the stationary bar 102. The up-standing arm 158 of the lever extends adjacent a relatively fixed projection 159 on one side of the movable guide bar 100, and the other arm 160 is connected by a cable 161, or the like, with a pedal 162 accessible to the foot of an attendant standing at the front of the machine. (See Figs. 4, 6, 12 and 13.) The pedal is pivoted to a depending support 163 at the back of the main frame, and the cable 161, is guided by a suitably disposed pulley 164 on the main frame, the arrangement of the parts being such that when the pedal is depressed the up-standing lever arm 158 is swung towards the rear or trailing end of the rack and the lever projection 128 is swung upward. In its rearward movement the arm 158 presses against the projection 159 of the bar 100, and, by virtue of the supporting links 101, lowers the bar 100 and the rack 44 against the action of the spring 104; and, at the same time, the lever projection 128 raises the respective arms 127, 136 of the feed and stop dogs in a manner to swing the dogs away from the ratchet teeth of the rack, thus freeing the latter, as seen in Fig. 13. Thereupon the weighted cable 113 returns the assembling rack to its initial position. This done, the operator releases the pedal; thus permitting the spring 104 to lift the bar 100 and rack 44, and the two dogs to re-engage the ratchet teeth of the rack. The operator then pushes the rod 147 rearward, against the tension of the spring 154, to engage the notch 155 of the rod with the trip-bar 143, thus removing the bolt 80 from the path of the clutch lever to effect the clutching of the pulley 74 to the continuously driven shaft 72 preparatory to a repetition of the fibre feeding and assembling operations hereinbefore described.

The manually-operative fibre gripper I hereinbefore referred to comprises a pair of clamping levers 165 (Figs. 2, 4, 6, 8) fulcrumed at 166 on a bracket 167 fixed on the upper end of a swinging supporting rod 168 which is pivoted at its lower end, as at 169, to the bar 28 of the rear frame. The inner arms of the levers are provided with a pair of complementary clamping jaws 170 of suitable length to embrace the layer of fibre, which jaws are held normally in clamping relation by the action of a suitably-disposed spring 171 on the inner arms of the levers. The outer arms of the levers are formed with handles 172 to facilitate the manual operation of the levers, as follows: The operator firmly grasps the two handles and opens the jaws of the levers. He then swings the gripper toward the rack till its open jaws embrace the forwardly projecting portion of the layer of fibres, as indicated in dotted lines in Fig. 6. He then permits the jaws to grip the fibres, and swings the gripper, with the layer of clamped fibres, toward the front of the machine. The center of gravity of the load on the supporting rod 168 is forward of the pivoted end of the rod, and hence the upper end of the rod and the associated levers tend to swing outwardly.

As a means to limit the outward throw of the gripper the rod 168 has pivoted thereto a gravity latch lever 173 the tooth 174 of which is arranged and adapted to abut against the forward top bar 26 of the main frame when the rod and levers are swung outward, as seen in Fig. 6.

The wire supporting and twisting mechanism hereinbefore referred to is as follows:

175, 176 designate a pair of chucks which are constructed and arranged to receive the extremities of a pair of stout wires W and support them in parallelism longitudinally of the gripper members 170 and in the space between the assembling rack 44 and the outward position of the gripper.

Each of the chucks 175, 176 comprises a base plate 177 having at its inner end a pair of complementary flared gripping jaws whereof one (178) is fixed and the other (179) is movable in a guide on the base plate. The movable jaw is connected to one arm of a lever 180 which is fulcrumed on the base plate. The other arm of the lever is eccentrically connected to a cam head 181 on a small hand lever 182, which head when the handle is moved in one direction bears against a stop 183 on the base plate and actuates the lever 180 to close the movable jaw and lock it in closed position, as in Fig. 2. When the hand lever 182 is swung in an opposite direction, the lever 180 is operated to open the movable jaw, as in Fig. 3. An angle piece 184 secured to the base plate serves as an end stop for the wires when they are seated between the jaws.

The base plate 177 of the chuck 175 is elongated and is slidably mounted between a pair of flanged guide rolls 185 on a bed plate 186 supported by a suitable supplemental frame J superposed on the main frame. The plate 186, with its appurtenances, is normally urged in a direction toward the adjacent end of the main frame by means of a weight loaded cable 187. (See Figs. 2, 3.)

The cable is secured to the outer end of the slide plate 177, and passes about and depends from a pulley 188 on an extension bar 189 on the frame J, the weight 190 being secured to the pendant end of the cable. The chuck 175 may be temporarily held in its inward position against the pull of the weighted cable by means of a latch lever 191 which is fulcrumed at 192 on the frame J and is held with its longer arm normally raised across the path of a suitably-disposed crosspiece 193 on the forward end of the slide plate 177, by the action of a spring 194 which is attached to the shorter arm of the lever and to the frame. When the longer arm 191 is manually depressed below the cross-piece the chuck 175 and its associated parts are subjected to the pull of the weighted cable. (See Figs. 2, 3, 6 and 8.)

The base plate 177 of the chuck 176 is fast on the inner end of a horizontal spindle 195 which has its bearings in brackets 196 on a stand K on the main frame. On the spindle 195 is a gear 197 between which and the spindle is a suitable clutch L by means of which the gear can be rendered fast or loose on the spindle. This gear meshes with a pinion 198 fast on a lower parallel shaft 199 having its bearings in the brackets 196, which shaft bears a pulley 200 which is connected with and continuously driven from a pulley 201 on the main shaft 31 by means of a belt 202. (See Figs. 1, 2, 3, 19 and 20.)

The clutch L herein shown includes a ratchet member 203 fast on the hub of the gear 197, and a clutch lever 204 pivoted on a disk 205 fast on the spindle adjacent the ratchet member. The shorter arm of the clutch lever is provided with a tooth 206 which is normally held in engagement with an opposing tooth of the ratchet by means of a spring 207 which is secured to the disk and arranged to press against the longer arm of the lever. The free end of the longer arm projects beyond the periphery of the disk and is adapted, when the gear 197 has made a predetermined number of rotations, to encounter a roll 208 which is arranged and adapted to be moved laterally into the path of the projecting lever arm in a manner to disengage the clutch lever from the ratchet member 203, thus unclutching the gear 197 from the spindle 195.

The roll 208 is mounted on a laterally projecting lug 209 adjacent the upper end of a vertical rocker arm 210 which is pivoted at its lower end at 211 on a bracket 212 at one side of the main frame. Pivoted on the upper end of the rocker-arm 210 is the depending arm 213 of a longitudinally disposed latch lever 214 whereof one end extends toward the adjacent end of the machine and is provided with a handle 215, and whereof the other end is provided on its under side with a beveled tooth portion 216. (See Figs. 3, 19, 20.)

The arm 213 has a suitably-disposed lug or projection 316 which, when the arm is moved toward the clutch by the action of a suitable spring 217 connecting the arm with the top of the stand K, abuts against a stop pin 218 on the vertical rocker arm 210, thus similarly moving the rocker arm and shifting the roll 208 thereon into the path of the clutch lever 204. The roll is latched in retracted position upon the periphery of the disk 205, against the force of the spring 217, by the engagement of the latch tooth 216 with the peripheral edge of an intermittently rotatable latch disk 219 fast on one end of a short horizontal shaft 220 having its bearing in a bracket 221 on the stand K. This disk has in its periphery a radial notch 222 so disposed that when the disk in its intermittent travel makes a complete rotation the notch aligns with the tooth of the latch bar, thus freeing the bar and permitting its instant projection by the action of the spring 217, the roll being moved into the path of the clutch lever to effect the release of the rotating gear.

When it is desired to remove the roll from the path of the clutch lever 204 and permit the re-engagement of the lever with the complementary clutch member 203 on the gear 197 the latch lever 214 is depressed at its handle portion and longitudinally moved toward and into engagement with the periphery of the latch disk 219.

As a simple and efficient means to prevent rotation of the shaft 195 and retain the chuck 176 in proper wire-receiving position when the gear 197 is unclutched, the hub of the clutch disk 205 is provided with a laterally-projecting stud 223 adapted to engage a suitably-disposed notch 224 in the longer arm 225 of a horizontal lever which is pivoted, as at 226, on a post 227 on the stand K. A spring 228 connecting the shorter arm 229 of the lever with a rearwardly projecting member 230 on the stand, maintains the longer arm normally raised, so that as the gear 197 approaches the limit of its rotation the stud rides upon and depresses the arm 225 until the stud 223 reaches the notch, whereupon the arm 225 snaps upward and engages its notch with the stud. (See Fig. 19.)

The pivot pin 226 for the notched lever is extended, as seen most clearly in Fig. 3, and a spring 231 is interposed between the head of the pin and the opposing side of the lever, thus permitting resilient lateral movement of the lever. The free end of the longer arm of the lever is offset, as at 232, to extend laterally adjacent the rocker-arm 210 and the depending arm 213 of the latch lever 214, and hence when the latch lever is manually shifted to remove the roll 208 from the path of the clutch lever and coincidentally engage the latch tooth 216 with the periphery of the latch disk 219, the arms 210, 213 press the opposing lever arm 225 laterally, thus disengaging the retaining notch of the arm 225 from the stud 223 on the gear 197.

Means for intermittently actuating the latch disk 219 in timed relation to the twisting cycle is as follows:

Fast on the outer end of the shaft 220 is a ratchet wheel 233 having a perscribed number of equally-spaced teeth, with which is adapted to engage a spring-pressed pawl 234 on one arm of a bell-crank lever 235 loose on the shaft 220. On the other arm of the lever 235 is a roll 236 which is held by means of a suitably-disposed spring 237 (Figs. 3, 4) in operative contact with a cam 238 fast on the shaft 195, the peripheral contour of the cam being such that in each rotation of the shaft 195 the pawl lever 235 is oscillated in a manner to advance the ratchet wheel a distance of one tooth, thus correspondingly moving the shaft 220 and the latch disk 219. Assuming the latch lever 214 be engaged with the latch disk and the gear 197 clutched to the shaft 195, such gear and its shaft will make one complete rotation during each step of the latch disk, and hence the number of steps of the latch disk before its notch 222 registers with and effects the release of the tooth of the latch lever 214 will determine the number of rotations of the gear 197 and its shaft 195 to which the ratchet disk 203 of the clutch L is secured.

The operation of the hereinbefore described wire supporting and twisting mechanism is as follows:

When the layer of fibers previously assembled in the rack has been withdrawn therefrom by the manual actuation of the swinging gripper I as hereinbefore explained, the operator places a suitable length of wire with its ends in the open chucks, 175, 176, the chuck 175 being temporarily held in inward position by means of the lever 191, against the pull of the weighted cable 187, and the gear 197 being unclutched from the shaft 195. He then swings the fibre gripper with its layer of fibres rearward to a position where the longitudinal median portion of the layer directly overlies the supported wire. He then places another similar wire in the open chucks, which second wire rests upon and longitudinally of the layer of fibres. He then by manipulation of the cam levers 182 closes the two chucks and clamps therein the ends of the two wires which closely embrace the layer of fibres. He next opens the jaws of the gripper and permits the gripper to swing to its outward position, as in Fig. 6. He then pushes down the lever 191 and releases the base plate 177 of the clutch 175, whereupon the pull of the weighted cable 187 is exerted on the wires to maintain them under tension. He then manipulates the handle of the latch lever 214 to withdraw the roll 208 from the path of the clutch lever 204, and the notched lever arm 225 from engagement with the stud on the clutch disk 205, and at the same time engages the toothed end of the latch lever with the intermittently rotating latch disk 219. This done, the gear 197 is clutched to the shaft 195 and the chuck 176 is rotated to effect the twisting together of the two wires and the associated fibres, thus producing a cylindrical brush body having a twisted wire core throughout its length. As the twisting proceeds the chuck 175 is gradually moved inward against the pull of the weighted cable 187 to the position indicated by the dotted lines in Fig. 8, thus compensating for the shortening of the wires incident to their twisting.

When the twisting operation has been completed the notch 222 of the latch disk 219 registers with the toothed portion of the latch lever; whereupon the lever is retracted by the action of the spring 217 and the gear 197 is unclutched from the shaft 195 and such shaft temporarily locked in place as previously described. The two chucks are then opened by manipulation of the cam levers 182 so as to release the ends of the twisted wires; the brush is removed, and the chuck 175 is retracted by the weighted cable and again latched in position by the latch lever 191.

After the withdrawal of the layer of fibre from the assembling rack by the operation of the gripper I, the operator depresses the pedal 162 to permit the disengagement of the dogs 122, 136 from the ratchet teeth 121 of the rack, whereupon the weighted cable 113 retracts the rack to its starting position with its initial fibre receiving space centrally beneath the transfer head D. This done, he releases the pedal, and pushes the bolt operating rod 147 backward until its notch 155 is engaged by the latch bar 143, thus removing the bolt 80 from the clutch lever of the clutch E and locking the bolt in idle position. Thus the pulley 74 is clutched to the shaft 72 and the pinion 61 and cam 135 are oscillated by the link and crank connection with the sector gear 68, thereby effecting the oscillation of the transfer head and the intermittent travel of the rack to accomplish the assembling of the fibres in the rack, as hereinbefore described.

During the fibre assembling operation, the operator places the ends of a wire W in the respective chucks 175, 176, advances the gripper to position the layer of fibres on the wire, and places upon the layer another wire with its ends seated in the chucks. He then closes the chucks by means of the cam levers 182, thus firmly holding the ends of the wires. He then opens the gripper jaws and permits the gripper to assume its outward position. This done he unlatches the non-rotatable chuck 175 by manipulation of the latch lever 191. He then manually shifts the latch lever 214 and engages its tooth with the intermittently-rotating latch disk, 219, thus moving the roll 280 into the path of the clutch lever 204 of the clutch L and thereby connecting the continuously rotating gear 197 to the spindle 195. Consequently the rotation of the spindle and its chuck 176 is commenced and continued until the latch lever 214 is released at the notch of the disk 219, as previously explained.

Upon the stopping of the rotating spindle and its chuck, the operator removes the brush from the chucks. At this juncture the assembling rack has been fully supplied with fibres, and the latch bar 143 has been actuated by the rack to release the bolt-operating rod 147, as aforementioned. This done, the operator again manipulates the gripper I to withdraw the new layer of fibres from the rack, and proceeds as before for the production of another brush, and so on.

After the brush is removed from the machine the fibres of the brush are peripherally trimmed in the usual manner to impart any desired contour to the brush, as indicated, for example, in Fig. 25.

It is to be understood that my invention is not limited to the particular construction disclosed, as the mechanisms may be modified within the principle of the invention and the scope of the appended claims.

I claim—

1. The combination with means for supplying fibres, of a fibre assembling rack, means for intermittently moving said rack, an oscillatory transfer head between the first-named means and the rack, said head including fibre-receiving portions and co-acting fibre discharge means, and means for oscillating said head and actuating its discharge means in timed relation to the travel of the rack.

2. The combination with means for supplying fibres, of a fibre assembling rack, means for intermittently moving said rack, an oscillatory transfer head between the first-named means and the rack, said head including fibre-receiving portions and co-acting fibre discharge means, means for oscillating said head and actuating its discharge means in timed relation to the travel of the rack, and a guard member extending longitudinally of and overhanging the path of the rack.

3. The combination with means for supplying fibres, of a fibre assembling rack, means for intermittently moving said rack, an oscillatory transfer head between the first-named means and the rack, said head including fibre-receiving portions and co-acting fibre discharge means, means for oscillating said head and actuating its discharge means in timed relation to the travel of the rack, a guard member extending longitudinally of and overhanging the path of the rack, and a longitudinally disposed backer-bar for the fibres contained in the rack.

4. The combination with two juxtaposed fibre supply hoppers, of a fibre assembling rack, means for intermittently moving said rack, an oscillatory transfer head between the hoppers and the rack constructed and arranged to transfer the fibres from the hoppers in alternation to the rack, said head including fibre receiving portions and co-acting fibre discharge means, and means for oscillating said head and actuating its discharge means in timed relation to the travel of the rack.

5. The combination with two juxtaposed fibre supply hoppers, of a fibre assembling rack, means for intermittently moving said rack, an oscillatory transfer head between the hoppers and the rack constructed and arranged to transfer the fibres from the hoppers in alternation to the rack, said head including fibre receiving portions and co-acting fibre discharge means, and means for oscillating said head and actuating its discharge means in timed relation to the travel of the rack, said latter means including interchangeable cam elements whereof one is effective to oscillate the head and actuate its discharge means to transfer fibres from both hoppers to the rack in each dwell of the rack, and whereof the other cam element is effective to operate the head and actuate its discharge means to transfer the fibres from one or the other hopper to the rack in each dwell of the rack.

6. The combination with means for supplying fibres, of an intermittently movable fibre assembling rack, a transfer element between the fibre supply means and the rack, and means for actuating said rack and transfer element in timed relation, whereby the rack is progressively supplied with bunches of fibres by the transfer element, and mechanism whereby the means for actuating the rack and transfer element are rendered inactive when the rack has received its quota of fibres.

7. The combination with means for supplying fibres, of an intermittently movable fibre assembling rack, a transfer element between the fibre supply means and the rack, means for actuating said rack and transfer element in timed relation, whereby the rack is progressively supplied with bunches of fibres by the transfer element, said latter means including feed devices for the rack, mechanism whereby the means for actuating the rack and transfer element are rendered inactive when the rack has received its quota of fibres, independently operable means for disengaging the feed devices from the rack, and means for retracting the rack to its starting position when the feed devices are disengaged therefrom.

8. The combination with means for supplying fibres, of an intermittently movable fibre assembling rack, a transfer element between the fibre supply means and the rack, a shaft, a continuously driven element, clutch means between said element and shaft, feed devices for the rack, operative connections between said shaft and the feed devices, operative connections between said shaft and the transfer element, means whereby the clutch is automatically released when the rack has received its supply fibres, independently operable means for disengaging the feed devices from the rack, and means for retracting the rack to its starting position when the feed devices are disengaged therefrom.

9. The combination with two juxtaposed fibre supply hoppers, of an intermittently movable fibre assembling rack, an oscillatory transfer head between the hoppers and the rack constructed and arranged to transfer the fibres from the hoppers in alternation to the rack, a shaft, a continuously driven element, clutch means between said element and shaft, feed devices for the rack, operative connections between said shaft and the feed devices, operative connections, including an oscillatory cam element, between said shaft and the transfer element, means whereby the clutch is automatically released when the rack has received its quota of fibres, independently operable means for disengaging the feed devices from the rack, and means for retracting the rack to its starting position when the feed devices are disengaged therefrom.

10. The combination with means for supplying fibres, of an intermittently movable fibre assembling rack, a transfer element between the fibre supply means and the rack, means for actuating said rack and transfer element in timed relation, whereby the rack is progressively supplied with bunches of fibre by the transfer element, said latter means including feed devices for the rack, mechanism whereby the means for actuating the rack and transfer means are rendered inactive when the rack has received its quota of fibres, a vertically-movable support for said rack, means tending to maintain said support in elevated position, independently operable means for disengaging the feed devices from the rack and lowering the support and rack, and means for retracting the rack to its starting position when the feed devices are disengaged therefrom.

11. The combination with an intermittently movable rack, means for progressively supplying fibre thereto, means for operating said rack and fibre supply means in timed relation, and mechanism for automatically stopping the operations of said rack and fibre supply mechanism when the rack has received a layer of fibres, of a pair of spaced-apart chucks forward of the rack constructed and arranged to receive the ends of core wires and support them in substantial parallelism with the layer of fibres, a fibre positioning element movable toward and from the rack in a path between the chucks, said element operable to withdraw the layer of fibres from the filled rack and also to position the layer between the chucks into core wire engaging position, and means for rotating one of said chucks.

12. The combination with an intermittently movable rack, means for progressively supplying fibre thereto, means for operating said rack and fibre supply means in timed relation, and mechanism for automatically stopping the operations of said rack and fibre supply means when the rack has received a layer of fibres, of a pair of spaced-apart chucks forward of the rack constructed and arranged to receive the ends of core wires and support them in substantial parallelism with the layer of fibres, a fibre positioning element movable toward and from the rack in a path between the chucks, said element operable to withdraw the layer of fibres from the filled rack and also to position the layer between the chucks into core wire engaging position, means for rotating one of said chucks, and longitudinal tensioning means for the other chuck.

13. The combination with an intermittently movable rack, means for progressively supplying fibre thereto, means for operating said rack and fibre supply means in timed relation, and mechanism for automatically stopping the operations of said rack and supply means when the rack has received a layer of fibres, of a pair of spaced-apart chucks forward of the rack constructed and arranged to receive the ends of core wires and support them in substantial parallelism with the layer of fibres, a fibre positioning element movable toward and from the rack in a path between the chucks, said element operable to withdraw the layer of fibres from the filled rack and also to position the layer between the chucks into core wire engaging position, means for rotating one of said chucks, longitudinal tensioning means for the other chuck, and means for automatically checking the operation of the rotating chuck after a prescribed number of rotations.

14. The combination with a fibre assembling rack, means for intermittently moving said rack, means for progressively supplying fibre thereto, and mechanism for automatically stopping the operations of said rack and supply means, of spaced-apart chucks forward of the rack constructed and arranged to receive the ends of core wires and support them in substantial parallelism with the layer of fibres, a manually-operative swinging gripper movable toward and from the rack in a path between the chucks, said element operable to grasp the layer of fibres and withdraw it from the rack and also to position the layer between the chucks into core wire engaging position, and means for rotating one of said chucks.

15. The combination with fibre-supply means, of a fibre transfer element comprising an oscillatory body having a peripheral fibre receiving portion, a fibre discharge member mounted on and carried by said body and independently movable toward and from the periphery of the body in close relation to the fibre receiving portion, means for oscillating said body to swing the said portion from fibre receiving to delivery position, and back again, and means for actuating said discharge member at the end of the delivery movement of the body to bear against the contained fibres and bodily push them from the fibre receiving portion of the body.

16. The combination with fibre-supply means, of a fibre transfer element comprising an oscillatory body having a peripheral fibre receiving portion, a discharge lever mounted on and carried by said body and movable toward and from the periphery of the body in close relation to the fibre receiving portion, means for oscillating said body to swing the said portion from fibre receiving to delivery position, and back again, and means for actuating said lever at the end of the delivery stroke of the body to bear against the contained fibres and bodily push them from the fibre receiving portion of the body.

17. The combination with fibre-supply means, of a fibre transfer element comprising an oscillatory body having a peripheral fibre receiving portion, a pair of discharge levers mounted on said body adjacent the respective sides thereof and movable toward and from the periphery of the body, means for oscillating said body to swing the said portion from fibre receiving position to delivery position, and back again, and means for simultaneously actuating said levers at the end of the delivery stroke of the body to force the fibres therefrom.

18. The combination with fibre-supply means, of a fibre transfer element comprising an oscillatory body having a peripheral fibre receiving portion, a discharge lever mounted on and carried by said body and movable adjacent said receiving portion toward and from the periphery of the body, a spring urging said lever toward the periphery of the body, a cam constructed and arranged to move the lever inwardly against the action of the spring in timed relation to the oscillatory motion of the body, and means for oscillating said body to swing the said portion from fibre receiving to delivery position, and back again.

19. The combination with fibre-supply means, of a fibre transfer element comprising an oscillatory body having a peripheral fibre receiving portion, an arcuate fibre retaining member supported adjacent the periphery of the body, a discharge lever mounted on and carried by said body and movable adjacent said receiving portion toward and from the periphery of the body, a spring urging said lever toward the periphery of the body, a cam constructed and arranged to move the lever inwardly against the action of the spring in timed relation to the oscillatory motion of the body, and means for oscillating said body to swing the said portion from fibre receiving to delivery position, and back again.

20. The combination with fibre-supply means having two independent feed portions, of an oscillatory fibre transfer head mounted in close relation to such feed portions, said head comprising a body having peripheral fibre receiving portions in spaced relation, fibre discharge members arranged in co-operative relation to the respective receiving portions, means for oscillating said head to present the receiving portions thereof at intervals to the respective feed portions of the supply means and to a common point of delivery, and means for actuating said discharge members in timed relation to the oscillatory motion of the said body.

21. The combination with an intermittently movable rack and means for progressively supplying fibre thereto, of a fibre positioning element movable toward and from the rack and operable to withdraw layers of fibre from the rack.

22. A brush machine comprising a fibre receiving rack, means for supplying fibres to the rack, core wire twisting means, and means for transferring the fibres to the core wires.

23. A brush machine comprising a fibre receiving rack, means for supplying fibres to the rack, core twisting means, and swinging fibre grippers for grasping the fibres on the rack and for transferring the fibres to the core wires.

24. A brush machine comprising a fibre receiving rack, spaced means for holding and twisting wires at the side of the rack, and swinging grippers arranged to be moved toward the rack to grip the fibres and then from the rack to a position between the wire twisters.

Signed at Frederick, in the county of Frederick and State of Maryland this 18th day of June, A. D. 1930.

WILLIAM D. LIPPS.